United States Patent [19]
Gawlick et al.

[11] 3,810,485
[45] May 14, 1974

[54] EXPLOSIVE CHARGE ACTUATED VALVE

[75] Inventors: Heinz Gawlick, Furth; Hellmut Bendler, Erlangen-Spardorf; Gunther Gottwald, Nurnberg; Gunter Hubsch, Kalchreuth; Karl Egon Flach, Cologne-Riehl, all of Germany

[73] Assignee: Dynamit Nobel AG, Troisdorf, Germany

[22] Filed: May 5, 1972

[21] Appl. No.: 250,768

[30] Foreign Application Priority Data
May 6, 1971  Germany............................ 2122423

[52] U.S. Cl....................... 137/71, 251/64, 251/330
[51] Int. Cl............................................. F16k 13/06
[58] Field of Search............................ 137/67–71; 220/47, 89 A; 251/63.5, 63.6; 222/3

[56] References Cited
UNITED STATES PATENTS
3,744,816  7/1973  Yamaguchi et al............... 137/68 X
2,405,439  8/1946  Lubbock et al..................... 137/68
3,141,470  7/1964  LaFontaine.......................... 137/68

OTHER PUBLICATIONS
"Explosive Actuated Valves" by M. W. Connell presented at the American Rocket Society, Sept., 1956.

Primary Examiner—William R. Cline
Assistant Examiner—Richard Gerard
Attorney, Agent, or Firm—Craig & Antonelli

[57] ABSTRACT

An explosive charge actuated pressure valve which combines the features of a self-sealing poppet valve with the advantages of a rupturing diaphragm by providing a sealing element connected to a piston and biased in the closed position against a valve seat disposed in the passage between an inlet opening and an outlet opening, the sealing element being connected to a piston in a chamber which is in communication with an explosive charge capable upon ignition of driving the sealing element against the valve seat with a force sufficient to rupture the sealing element to open the passage between the inlet and outlet openings.

9 Claims, 6 Drawing Figures

EXPLOSIVE CHARGE ACTUATED VALVE

This invention relates in general to valves, and more particularly to a valve with an inlet opening and an outlet opening, wherein the inlet opening can be connected to a source of pressure medium and is closed with respect to this pressure medium source by means of a sealing element.

In pressure medium containers, bursting diaphragms are employed in many cases as safety relief means for pressure relief and as a sealing element which makes a rapid opening and thus emptying possible. However, the use of these bursting diaphragms is very limited, since the bursting pressure thereof must be selected to be relatively high to provide safety against excess pressure, for example due to large temperature increases. As a consequence thereof, a defined bursting within a narrow range of tolerance with respect to bursting pressure and bursting time is no longer ensured by such devices.

Additionally, on account of the material characteristics of the bursting diaphragm and in dependence on the occurring pressure, the cross section of the efflux opening is often undefined. Moreover, bursting diaphragms with narrow tolerances with respect to bursting pressure and bursting time require large expenditures for testing and manufacturing, not considering the fact that also the sealing of the diaphragm with respect to the pressure tank is complicated, since the ambient pressure within the tank acts to lift the seal off its seat. Finally, the use of bursting diaphragms in pressure medium tanks makes it necessary to provide a separate feed opening, the tight sealing of which, however, likewise provides a difficult problem. Compared with these negative features, a bursting diaphragm has the advantage that it opens more rapidly than any other valve construction.

Although other sealing devices for pressure medium tanks such as, for example, cone valves, can be designed to be self-sealing, they must be opened in such a case against the ambient pressure in the tank, which requires considerable force. Apart from this fact, they do not uncover the aperture cross section within the desired or even necessary short period of time, or uncover such cross section only to an insufficient extent.

It is an object of this invention to avoid the above-mentioned disadvantages. In accordance with this invention, this object is attained by providing a sealing element for the valve which is fashioned as a disk or the like completely spanning the cross section of the inlet opening in the manner of a cone valve and provided with a predetermined rupturing zone, so that with the proper degree of force in the direction of the ambient pressure the disk will move to open the inlet. The disk is connected, via a connecting member, with a piston axially displaceably arranged in a bore of the valve housing, this piston forming a space with the housing, which space is in communication with a propellant charge device formed in the housing so that, upon the ignition of a propellant charge in the propellant charge device, the piston is subjected to such a force in the direction of the pressure expended by the pressure source that a level of force is reached which is necessary for the destruction of the predetermined breaking zone of the sealing element. The thus-constructed valve therefore combines the advantages of a cone valve in a self-sealing design with the advantages of a rupturing diaphragm and accordingly ensures a rapid opening of the full throughflow cross section.

In a further development of this invention, an arrangement and construction is provided wherein, in the triggered condition, i.e., in the open position, the entire throughflow cross section between inlet and outlet openings is free of functional elements of any kind, so that consequently the pressure medium can flow therethrough without any impediment whatever.

For the sealing element, the invention provides a known closure member in the form of a valve cone or poppet which automatically seals under the pressure of the pressure medium source. In accordance with another engagement, the provision is made to subdivide the valve housing, in the zone on the inlet side, into two portions to be connectable, for example, by threaded connection. In this regard, the portion of the housing constituting the inlet opening is formed integrally with a disk which completely extends over the inlet cross section and represents the sealing element. This embodiment constitutes an optimum construction with respect to leakproofness; however, when used as an outlet valve for pressure medium tanks, this embodiment exhibits the disadvantage as compared to the first-mentioned construction in that it is impossible to fill the tank with pressure medium through the valve.

If, in accordance with the suggestion of the present invention, the predetermined rupturing zone in the region of the outer rim of the sealing element is fashioned as an annular notch, the largest possible throughflow cross section can be obtained. Here, it is possible when forming the sealing element as a separate part, as well as when forming the same integrally with the housing, to dispose the part of the sealing element remaining in the region of the inlet opening after the predetermined rupturing zone has been sheared off at least almost entirely outside of the throughflow cross section.

Furthermore, for attaining an optimum flow path according to the invention, it is advantageous to provide a recess in the housing lying outside of the flow path for receiving the sealing element in the open position of the valve. In order to prevent the danger of damage to the valve housing and other reusable valve parts, it is suitably provided in this connection, to arrange in the recess a resilient and/or deformable damping member, for example a ring made of lead. However, it is also possible to fashion the resilient and/or deformable member simultaneously as a sealing element, in which case a ring of rubber or other sealing material could also be utilized instead of the lead ring.

Especially when using a sealing element fashioned as a separate part, it is advantageous to provide a spring which is constantly under tension in the closed position of the valve, in the space formed between the piston and the housing, around the connecting member, since this ensures a firm and tight seating of the sealing element, and thus, safety during transporting of the system even when this sealing element is not under the pressure of a pressure medium on the inlet side. If additionally the position is arranged on the connecting member to be axially displaceable, the spring bias force can be advantageously varied and thus adapted to differing transportation conditions.

Along the lines of reusability of the valve, it is advantageous to form the propellant charge chamber as a plug or the like which can be inserted, preferably threaded, into the housing wall, so that after wear and tear due to prolonged use, only the plug needs to be replaced. Besides, this arrangement and construction affords the additional advantage that it is possible to adapt the mechanism, by the use of plugs, in a simple and inexpensive manner to any required propellant charges of differing dimensions, merely by the utilization of plugs having corresponding, differently dimensioned propellant charges.

These and other objects, features and advantages of the present invention will be explained in greater detail in conjunction with the accompanying drawings, which illustrate several exemplary embodiments of the invention, and wherein.

Figure 1:
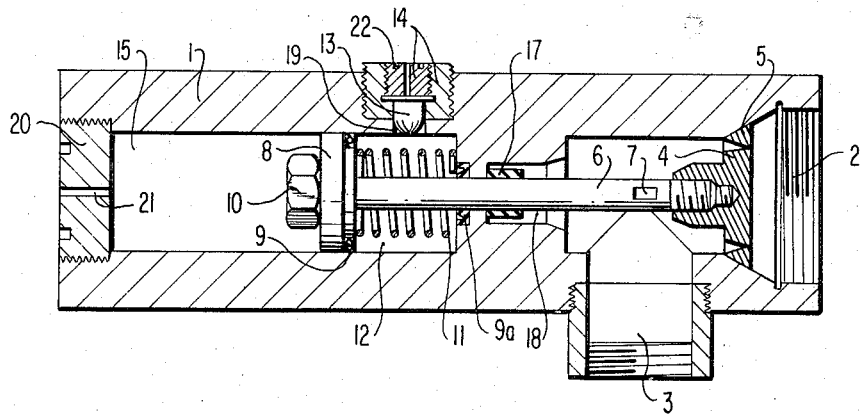
FIG. 1 is a longitudinal sectional view of a valve in the closed position.

According to FIGS. 1 and 2, the valve housing 1 is provided with an inlet opening 2 as well as a discharge or outlet opening 3, wherein the latter, however, can simultaneously serve as an aperture for filling from a pressure medium source disposed on the outlet side of the valve, for example a pressure tank, as will be described in connection with the operation of the valve. The inlet opening is sealed by means of the valve cone 4 having a predetermined rupturing line 5, formed in any well-known manner. The valve cone 4 is connected, via the valve stem 6 with the pressure piston 8, which is provided with a sealing ring 9 and is adjustably attached to the valve stem 6 by means of the nut 10. The milled area 7 at the valve stem 6 serves as a means for bracing the valve stem by means of a forked wrench or the like during assembly.

The pressure piston 8, together with the valve housing 1, forms the chamber 12 within which the compression spring 11 is arranged between the piston 8 and the housing 1 around the valve stem 6 in such a manner that it is under tension in the closed position of the valve and presses, via the stem 6, the valve cone 4 with its conical outer surface sealingly against the conical surface of the inlet opening 2.

The cavity 15 is closed off by the screw plug 20 which has a bore 21 to permit the pressure piston 8 to move during the functioning of the valve. The propellant charge device 19 is connected to the chamber 12. In this arrangement, the propellant charge 13, electrically ignitable by way of the wires 22, is accommodated in the screw plug 14, fashioned as a cartridge device.

For receiving the lower portion of the valve cone 4 in the open position of the valve, the recess 18 is formed in the housing 1. The ring 17 disposed about the valve stem 6 in this recess can have a shock-absorbing and/or sealing function and can be made of a corresponding material, for example, lead, rubber, or the like.

The mode of operation of the valve is as follows. After ignition of the propellant charge 13 via the wires 22, the propellant gases in the chamber 12 exert a pressure on the piston 8 sufficient to shear off the valve cone 4 along its predetermined rupturing line 5. The valve cone is, when the valve is connected, for example, to a pressure tank (not shown) under the pressure of the pressure medium present in the tank, as well as under the pressure of the spring 11. Under these conditions, the piston 8 moves, with the valve stem 6 and the valve cone 4, from the closed position shown in FIG. 1 into the open position illustrated in FIG. 2 and thus frees the inlet opening 2 and accordingly the path to the discharge aperture 3. The sheared-off, annular portion 16 of the valve cone 4 remains seated in the conical wall of the inlet opening 2 during the discharge process. During its displacement into the open position, the valve cone 4 contacts the ring 17, and the latter is thereby deformed and exerts, depending on its desired purpose, a more or less strong damping and/or sealing function. A further seal 9a is provided between the housing 1 and the valve stem 6.

Figure 2:
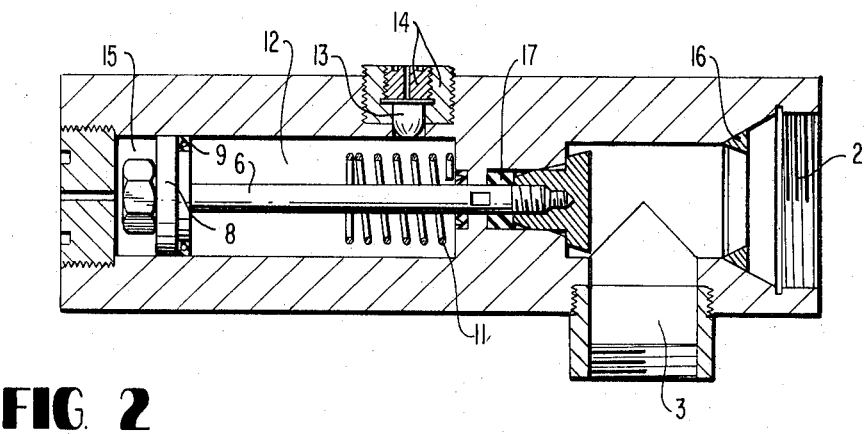
FIG. 2 is a longitudinal sectional view of the valve of FIG. 1 in the open position.

As can be seen from FIG. 2, the chamber between the inlet opening 2 and the outlet opening 3 is entirely free of interfering elements after the valve is opened, so that the pressure medium can flow from the pressure medium tank (not shown) unhindered through the valve.

For the intended filling of a pressure medium tank connected to the inlet opening 2, the medium to be introduced is fed from a source under pressure via the discharge opening 3. During this step, the valve head 4 moves, via the valve stem 6 with the pressure piston 8, against the bias of the spring 11, in the direction toward the inlet opening 2 so that the medium to be introduced can be fed into the container via this opening. The spring 11 insures, in the unfilled (pressure-less) condition of a tank connected on the inlet side, or also when the valve is not connected, that the valve head 4 is firmly seated in the cone of the valve housing 1 and thus cannot be damaged even in case of possible transporting of the device.

Figure 3A:
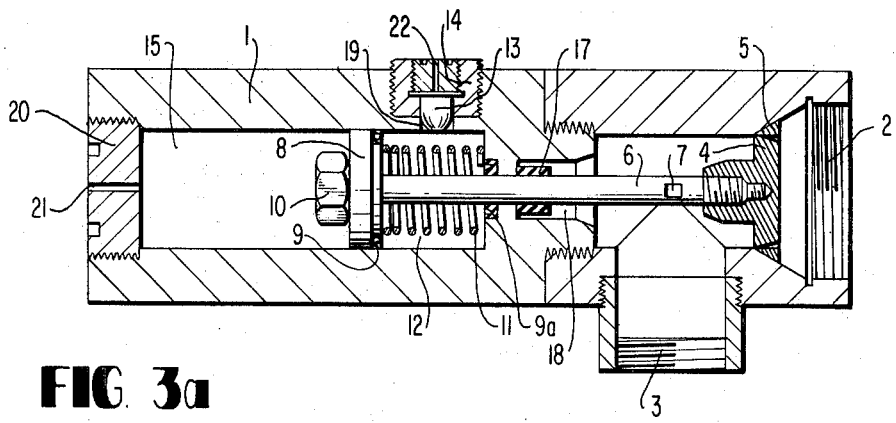
FIGS. 3a and 3b are longitudinal sectional views of a modification of the valve on the inlet side.
Figure 3B:
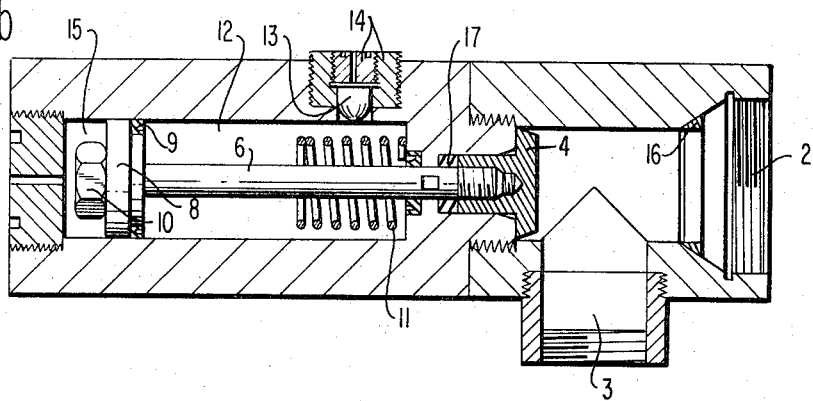

In the sectional view of FIG. 3a, the predetermined rupturing line 5 is formed on the externally disposed side of the valve head 4. In a deviation from the construction illustrated in the drawing, the valve head could here be fashioned so that it extends with its outer end into the annular recess in the housing 1 whereby, after the element has been sheared off along the predetermined rupturing line, the remaining annular portion would be disposed entirely outside of the throughflow cross section and would form, with its internally positioned surface area, the extension of the conical surface of the housing 1. FIG. 3b shows the open position of the valve. In addition, since the housing 1 is formed in two parts which are threadedly connected, the portion of the housing including the inlet opening 2 and outlet opening can be removed and replaced along with the valve head 4 after the valve has been actuated.

Figure 4A:
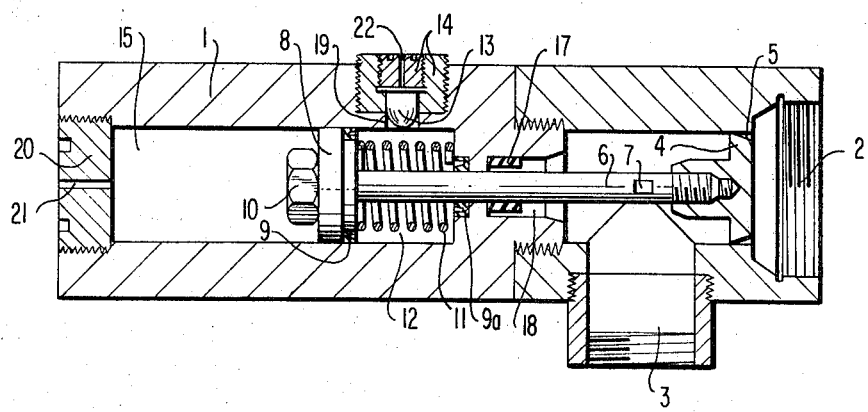
FIGS. 4a and 4b are longitudinal sectional views of another modification of the valve on the inlet side.
Figure 4B:
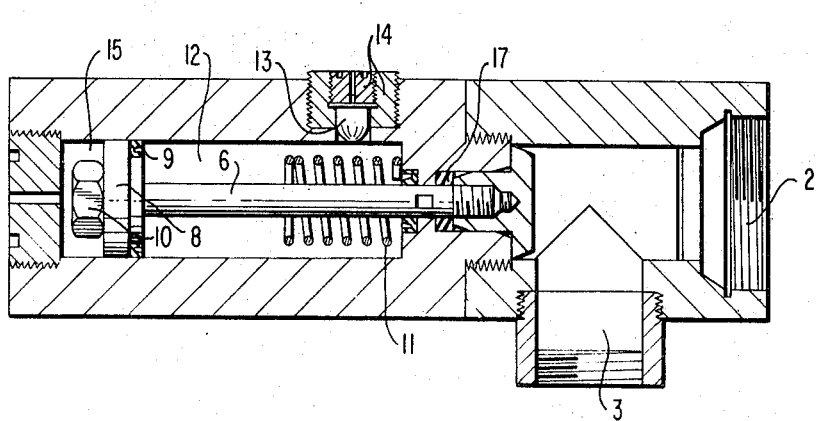

In the section of FIG. 4a, the valve head 4 is formed integrally with the housing 1, wherein the predetermined rupturing line 5, as illustrated, can be arranged on the outside, or also on the inside. In this construction, which poses no sealing problems whatever in the zone of the inlet opening 2 in the closed position of the valve, it is advantageous in certain cases to fashion the portion of the housing 1 on the inlet side as a separate section which can be threadedly or otherwise connected with the remainder of the housing, similar to the embodiment of FIG. 3a. FIG. 4b shows the valve in its open position.

What is claimed is:

1. An explosive charge actuated pressure valve comprising a housing having a pressure passage extending between an inlet opening and an outlet opening, a sealing element substantially completely spanning the cross section of said passage, said housing having a chamber in which is disposed a piston connected to one end of a connecting rod extending through a partition wall of said housing and being connected to said sealing element, and an explosive charge device mounted in said housing in communication with an expansible chamber defined by said housing, said piston and said partition wall, said sealing element being provided with a rupturing zone and so disposed in a valve seat in said passage that upon ignition of said explosive charge device said sealing element is forced against said valve seat with a force capable of destroying said rupturing zone to permit translation of said sealing element past said outlet opening.

2. A valve according to claim 1, wherein said partition wall includes a recess surrounding said connecting rod having a size capable of receiving said sealing element so that in the triggered condition the entire flow path between the inlet opening and the outlet opening is free of any elements.

3. A valve according to claim 2 wherein a deformable damping element is disposed in said recess and surrounds said connecting rod.

4. A valve according to claim 1 wherein said sealing element is provided in the form of a valve cone.

5. A valve according to claim 4 wherein said valve seat is disposed in said passage, and further including spring means for biasing said valve cone into sealing contact with said valve seat.

6. A valve according to claim 1 wherein said rupturing zone is fashioned as an annular notch in one surface of said sealing element.

7. A valve according to claim 1 wherein a spring is disposed in the space between said piston and said partition wall to bias said sealing element into the closed position thereof.

8. A valve according to claim 1 wherein said explosive charge device is mounted in a plug threadedly engaged in said housing.

9. A valve according to claim 8 wherein said rupturing zone is fashioned as an annular notch in one surface of said sealing element.

* * * * *